J. A. STEFFENS.
PROCESS OF PRODUCING CATALYZERS.
APPLICATION FILED DEC. 24, 1918.
1,400,247.  Patented Dec. 13, 1921.
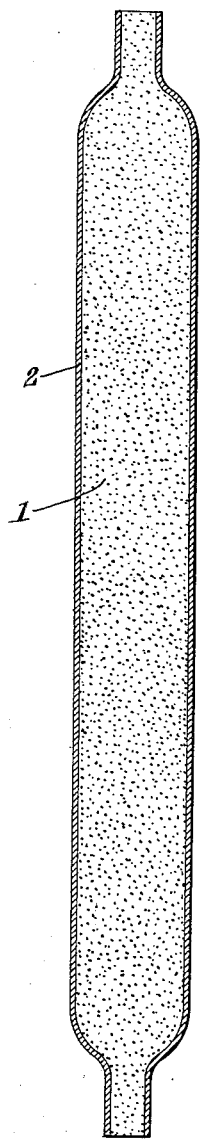

UNITED STATES PATENT OFFICE.

JOHN A. STEFFENS, OF BALTIMORE, MARYLAND, ASSIGNOR TO U. S. INDUSTRIAL ALCOHOL CO., A CORPORATION OF WEST VIRGINIA.

PROCESS OF PRODUCING CATALYZERS.

1,400,247.  Specification of Letters Patent.  Patented Dec. 13, 1921.

Application filed December 24, 1918. Serial No. 268,185.

*To all whom it may concern:*

Be it known that I, JOHN A. STEFFENS, of Baltimore, in the State of Maryland, have invented a certain new and useful Improvement in Processes of Producing Catalyzers, and do hereby declare that the following is a full, clear, and exact description thereof.

My invention relates particularly to a process of producing catalyzers which are used in the production of aldehydes.

The object of my invention is to provide a process by which catalyzers of the above type may be advantageously made by which efficient catalyzers may be obtained to bring about the production of aldehydes, as for example acetaldehyde, by passing alcohol over a catalyzer of this character while heated.

Another object of my invention is to provide a process of producing catalyzers containing a catalytic metal, such for example as copper, nickel, chromium or iron, to be used for the production of aldehydes in this way.

The object of my invention is especially, however, to provide a process in which a catalytic metal may be efficiently produced and in which the catalytic material thus obtained is a better catalyzer than in the form in which it was previously produced.

Further objects of my invention will appear from the detailed description thereof contained hereinafter.

While my invention is capable of being carried out in many different ways, I shall describe hereinafter only one way of carrying out the same, and shall show only one form of apparatus used in connection with the same in the accompanying drawing, in which—

The figure is a vertical section of a tube in which the catalyzer is formed in accordance with my invention.

For example, I may add to 50 parts by weight of granular pumice stone, or unglazed porcelain, or charcoal, or terra cotta, which may have a fineness such as to pass through a sieve having 10 meshes to the inch, 50 parts by weight of a nitrate of a metal having catalytic properties, such for example as cupric nitrate or nickel nitrate, $Ni(NO_3)_2$, or both, dissolved in an equal weight of water. When the absorbent material, such for example as the pumice stone, has absorbed, *e. g.*, the copper nitrate, a quantity of ammonia sufficient to precipitate the copper as copper hydrate is added. This will be approximately an amount of a water solution of ammonia having a strength of 26% equal to one-half the weight of the copper or nickel nitrate added.

The mixture containing the ammonium nitrate is then dried and ignited to form the metal oxid, which will be contained within and upon the particles of the pumice stone. The ignition causes the ammonium nitrate to volatilize and render the metal oxid porous so that the small particles of metal carried by the pumice stone or other inert material after having been reduced from the oxid, will be in a porous condition throughout, that is, they will contain a large number of small air spaces through which gases may pass.

The granular catalyzer forming material 1 is then filled into a tube such as copper tube 2, and the tube is then heated for several hours at a temperature of 300° C., while a current of vapors of an alcohol, such for example as ethyl alcohol or methyl alcohol, is being passed through the same over the granular catalyzer forming material, so that, as a result, the metal oxid is reduced to the finely divided corresponding metal. It will be understood that the alcohol introduced is decomposed to some extent (and perhaps this is due to the action of those particles of copper first reduced) to form its corresponding aldehyde, such for example as acetaldehyde or formaldehyde, and nascent hydrogen. The catalytic material thus obtained is much more active for the production of acetaldehyde or formaldehyde than if the catalytic material were produced merely by the introduction of a current of hydrogen.

These tubes containing the granular catalyzer may be then used in the production of aldehydes, as for example the production of acetaldehyde, by passing ethyl alcohol vapors through the tubes at a temperature between 250° and 350° C., the acetaldehyde and hydrogen vapors being carried off for separation in any suitable manner. Similarly, the tubes containing the granular catalyzer may be used for the production of formaldehyde from methyl alcohol by passing the vapors of the latter through the tubes at a temperature between 500° and 650° F., the formaldehyde and hydrogen being carried off for separation in any suitable manner. The reduced metal obtained in this manner produces much higher yields of the aldehyde than were previously obtainable by the use of a metal reduced in accordance with other processes.

It will be understood, also, that the alcohols may be used to reduce the metallic oxids for the purpose of producing catalyzers in many different types of processes used for the production of the oxid.

While I have described my invention above in detail, I wish it to be understood that many changes may be made therein without departing from the spirit of the invention.

I claim:

1. The process of making a catalyst comprising precipitating the nitrate of a catalytically active metal with ammonia, allowing the ammonium nitrate formed to remain in the precipitate, drying and igniting to form an oxid, and reducing the latter with alcohol vapors at a temperature within the range of 250 to 350° C.

2. The process of making a catalyst comprising precipitating the salt of a catalytically active metal with ammonia, allowing the ammonium salt formed to remain in the precipitate, drying and igniting to form an oxid, and reducing the latter at a temperature within the range of about 250 to 350° C.

In testimony that I claim the foregoing I have hereunto set my hand.

JOHN A. STEFFENS.

Witnesses:
 HERMAN F. WILLKIE,
 WILLIAM WATSON.